(12) United States Patent
Kato

(10) Patent No.: US 11,342,550 B2
(45) Date of Patent: May 24, 2022

(54) ELECTRODE BODY FOR LEAD-ACID BATTERY, LEAD-ACID BATTERY USING THE SAME, AND METHOD OF MANUFACTURING ELECTRODE BODY FOR LEAD-ACID BATTERY

(71) Applicants: Hideaki Kato, Takasaki (JP); TAKASAKI DENKA KOUGYOUSHO CO., LTD., Takasaki (JP)

(72) Inventor: Hideaki Kato, Takasaki (JP)

(73) Assignees: Hideaki Kato, Takasaki (JP); TAKASAKI DENKA KOUGYOUSHO CO., LTD., Takasaki (JP)

( * ) Notice: Subject to any disclaimer, the term of this patent is extended or adjusted under 35 U.S.C. 154(b) by 106 days.

(21) Appl. No.: 16/614,137

(22) PCT Filed: Oct. 12, 2018

(86) PCT No.: PCT/JP2018/038209
§ 371 (c)(1),
(2) Date: Nov. 15, 2019

(87) PCT Pub. No.: WO2019/116712
PCT Pub. Date: Jun. 20, 2019

(65) Prior Publication Data
US 2020/0106091 A1    Apr. 2, 2020

(30) Foreign Application Priority Data

Dec. 11, 2017  (JP) .............................. JP2017-252385

(51) Int. Cl.
*H01M 4/20* (2006.01)
*H01M 4/46* (2006.01)
(Continued)

(52) U.S. Cl.
CPC .............. *H01M 4/20* (2013.01); *H01M 4/463* (2013.01); *H01M 4/685* (2013.01); *H01M 10/06* (2013.01);
(Continued)

(58) Field of Classification Search
None
See application file for complete search history.

(56) References Cited

U.S. PATENT DOCUMENTS 6,566,010 B1    5/2003  Bhardwaj et al.

FOREIGN PATENT DOCUMENTS

| CN | 101092707 A | 12/2007 |
|----|-------------|---------|
| CN | 107069042 A | 8/2017 |

(Continued)

OTHER PUBLICATIONS

International Search Report dated Dec. 25, 2018, issued in counterpart International Application No. PCT/JP2018/038209, with English Translation. (4 pages).

(Continued)

*Primary Examiner* — Daniel S Gatewood
(74) *Attorney, Agent, or Firm* — WHDA, LLP

(57) ABSTRACT

The weight and size of a lead-acid battery is reduced and the energy density per mass by forming base members of components of the lead-acid battery is improved by using aluminum or aluminum alloy and forming multiple plating layers on a surface of each base member. In order to prevent formation of pinholes in the multiple plating layers, the surface of the base member 22 is subjected to flattening processing, a solder plating layer with a film thickness of 10 μm or more is formed, or many layers of group 4 metals with similar chemical properties are laminated. Moreover, in a positive electrode plate and a negative electrode plate, an active material layer 24 is formed on the outermost lead (Continued)

plating layer by an electrolytic formation treatment to improve the charging and discharging efficiencies of the lead-acid battery and to greatly reduce fall-off the active material layer 24.

19 Claims, 11 Drawing Sheets

(51) Int. Cl.
*H01M 4/68* (2006.01)
*H01M 10/06* (2006.01)
*H01M 4/02* (2006.01)

(52) U.S. Cl.
CPC ............... *H01M 2004/027* (2013.01); *H01M 2004/028* (2013.01)

(56) References Cited

FOREIGN PATENT DOCUMENTS

| | | | | |
|---|---|---|---|---|
| CN | 107069042 | A | * | 8/2017 |
| JP | 47-26633 | A | | 10/1972 |
| JP | 50-9538 | Y1 | | 3/1975 |
| JP | S509538 | B1 | * | 4/1975 |
| JP | 59-191561 | A | | 10/1984 |
| JP | 60-25153 | A | | 2/1985 |
| JP | 63-2253 | A | | 1/1988 |
| JP | 63-174276 | A | | 7/1988 |
| JP | H05-299094 | A | | 11/1993 |
| JP | H05-343049 | A | | 12/1993 |
| JP | 11-111275 | A | | 4/1999 |
| JP | 2002-313347 | A | | 10/2002 |
| JP | 2002313347 | A | * | 10/2002 |
| JP | 2008-287909 | A | | 11/2008 |
| WO | 2004/004027 | A2 | | 1/2004 |

OTHER PUBLICATIONS

Machiyama, Yoshiaki et al., "Lead Alloy Current-Collectors Manufactured by a Power Rolling Process and its Corrosion Behavior under Lead-Acid Battery Conditions", Shin-Kobe Technical Report, Feb. 2009, No. 19, pp. 3-10; Cited in the Specification, with English Summary. (8 pages).

Yolshina LA et al: "A lead-film electrode on an aluminum substrate to serve as a lead-acid battery plate", Journal of Power Sources, Elsevier SA, CH, vol. 78, No. 1-2, Mar. 1, 1999 (Mar. 1, 1999), pp. 84-87, XP004164189; Cited in Extended European Search Report dated Feb. 24, 2021. (4 pages).

Extended (Supplementary) European Search Report dated Feb. 24, 2021, issued in counterpart EP Application No. 18887921.7. (7 pages).

Office Action dated Feb. 8, 2022, issued in counterpart CN Application No. 201880025215.5, with English Translation. (16 pages).

* cited by examiner

| EXAMPLE | STACKED PLATING FILM THICKNESS ($\mu$m) | AVERAGE WEIGHT (g) | DISCHARGING TIME (MINUTE) | PRESENCE OR ABSENCE OF PINHOLE |
|---|---|---|---|---|
| 8 | 5±1 | 6.96 | 24 | PINHOLE PRESENT IN TWO POSITIVE ELECTRODES AND ONE NEGATIVE ELECTRODE ONE TO TWO PINHOLES |
| 9 | 10±2 | 8.08 | 46 | PINHOLE PRESENT IN ONE POSITIVE ELECTRODE AND ONE NEGATIVE ELECTRODE ONE PINHOLE EACH |
| 10 | 20±2 | 10.41 | 68 | PINHOLE PRESENT IN ONE POSITIVE ELECTRODE ONE PINHOLE |
| 11 | 30±2 | 12.42 | 202 | PINHOLE ABSENT IN ALL POSITIVE ELECTRODES AND NEGATIVE ELECTRODES |
| 12 | 50±2 | 17.04 | 248 | PINHOLE ABSENT IN ALL POSITIVE ELECTRODES AND NEGATIVE ELECTRODES |
| 13 | 80±3 | 23.92 | 312 | PINHOLE ABSENT IN ALL POSITIVE ELECTRODES AND NEGATIVE ELECTRODES |
| 14 | 100±5 | 28.12 | 328 | PINHOLE ABSENT IN ALL POSITIVE ELECTRODES AND NEGATIVE ELECTRODES |
| 15 | 150±5 | 39.16 | 338 | PINHOLE ABSENT IN ALL POSITIVE ELECTRODES AND NEGATIVE ELECTRODES |
| 16 | 200±10 | 50.86 | 344 | PINHOLE ABSENT IN ALL POSITIVE ELECTRODES AND NEGATIVE ELECTRODES |
| 17 | 250±10 | 61.08 | 346 | PINHOLE ABSENT IN ALL POSITIVE ELECTRODES AND NEGATIVE ELECTRODES |
| 18 | 300±10 | 81.96 | 347 | PINHOLE ABSENT IN ALL POSITIVE ELECTRODES AND NEGATIVE ELECTRODES |

FIG.16

| EXAMPLE | STACKED PLATING FILM THICKNESS ($\mu m$) | AVERAGE WEIGHT (g) | DISCHARGING TIME (MINUTE) | PRESENCE OR ABSENCE OF PINHOLE |
|---|---|---|---|---|
| 19 | 5±1 | 6.9 | 112 | PINHOLE ABSENT IN ALL POSITIVE ELECTRODES AND NEGATIVE ELECTRODES |
| 20 | 10±2 | 8.01 | 148 | PINHOLE ABSENT IN ALL POSITIVE ELECTRODES AND NEGATIVE ELECTRODES |
| 21 | 20±2 | 10.3 | 188 | PINHOLE ABSENT IN ALL POSITIVE ELECTRODES AND NEGATIVE ELECTRODES |
| 22 | 30±2 | 12.28 | 212 | PINHOLE ABSENT IN ALL POSITIVE ELECTRODES AND NEGATIVE ELECTRODES |
| 23 | 50±2 | 16.84 | 254 | PINHOLE ABSENT IN ALL POSITIVE ELECTRODES AND NEGATIVE ELECTRODES |
| 24 | 80±3 | 23.12 | 321 | PINHOLE ABSENT IN ALL POSITIVE ELECTRODES AND NEGATIVE ELECTRODES |
| 25 | 100±5 | 27.92 | 319 | PINHOLE ABSENT IN ALL POSITIVE ELECTRODES AND NEGATIVE ELECTRODES |
| 26 | 150±5 | 38.46 | 334 | PINHOLE ABSENT IN ALL POSITIVE ELECTRODES AND NEGATIVE ELECTRODES |
| 27 | 200±10 | 50.06 | 344 | PINHOLE ABSENT IN ALL POSITIVE ELECTRODES AND NEGATIVE ELECTRODES |
| 28 | 250±10 | 59.08 | 347 | PINHOLE ABSENT IN ALL POSITIVE ELECTRODES AND NEGATIVE ELECTRODES |
| 29 | 300±10 | 80.21 | 348 | PINHOLE ABSENT IN ALL POSITIVE ELECTRODES AND NEGATIVE ELECTRODES |

ELECTRODE BODY FOR LEAD-ACID BATTERY, LEAD-ACID BATTERY USING THE SAME, AND METHOD OF MANUFACTURING ELECTRODE BODY FOR LEAD-ACID BATTERY

TECHNICAL FIELD

The present invention relates to an electrode body for a lead-acid battery, a lead-acid battery using the same, and a method of manufacturing an electrode body for a lead-acid battery.

BACKGROUND ART

A lead-acid battery has been conventionally widely used for automobiles, industries, and the like and has a long track record as being a low-cost highly-reliable battery. Generally, in the lead-acid battery, positive electrode plates and negative electrode plates which are power generating components are stacked one on top of another with a separator interposed between each two plates to form an electrode plate group and are connected to one another with an electrode plate group stripe. Then, a positive electrode terminal and a negative electrode terminal are attached to both ends of the electrode plate group stripe and dilute sulfuric acid is used as electrolyte to form the battery. Normally, in a so-called paste-type lead-acid battery, the positive electrode plates and the negative electrode plates are manufactured as follows. A lattice made of lead alloy is filled with a substance obtained by kneading water, dilute sulfuric acid, and lead powder made of lead oxide and metal lead which serve as active materials or with a substance obtained by kneading the aforementioned substance with a reinforcement agent such as fibers. Thereafter, the lattice is subjected to preheating drying, maturing, and drying and an electrode plate of a type using an unconverted paste-form active material is thereby manufactured.

The electrode plate groups are subjected to electrolytic formation treatment step and then inserted into a battery case together with sulfuric acid with specific gravity of 1.28 to 1.30 and a single cell with nominal voltage of 2.0 V is thereby formed. For use in automobiles, six single cells are connected to form a storage battery with nominal voltage of 12V.

In recent years, particularly in the automotive industry and like which produce an enormous number of vehicles, an increase in environmental awareness has led to active development of an environment-friendly vehicle with further reduced emission and fuel efficiency improved by weight reduction. In the case of lithium-ion batteries, major challenges in the course of development are an improvement in safety and cost reduction. Meanwhile, in the case of lead-acid batteries, major challenges are an improvement in durability and reduction in the usage amount of lead which is a metal with large specific gravity, the reduction achieving weight reduction and contributing to an improvement in fuel efficiency. Moreover, the lead-acid battery has the following problem to be solved in the future. Although a dust collector is used in a manufacturing process of the positive electrode plates and the negative electrode plates, the lead powder in a fine powder form is constantly used and the manufacturing step thus needs to be fundamentally improved in a comprehensive manner.

Moreover, the positive electrode plates and the negative electrode plates in the conventional lead-acid battery which are typically the paste-type are manufactured by filling the lattice made of lead alloy with the active material, which is obtained by kneading the lead powder formed of lead oxide and metal lead in the fine powder form, and hardening the active material. Accordingly, the conventional lead-acid battery has, in addition to problems of large mass and a poor working environment in the manufacturing step, such a durability problem that, in the automotive industry and the like, when the battery is used for a long period, the active material falls off due to vibration.

As a conventional technique of reducing the weight of the lead-acid battery, Patent Document 1 is known in which a burr formed in the electrode plate group stripe is mechanically removed. Moreover, Patent Document 2 which uses a bipolar electrode obtained by bonding electrode plates made of an active material held by electrically-conductive fibers is known. Furthermore, Patent Document 3 in which weight reduction is achieved by using an electrode lattice with a combined structure of a lead plate and a resin sheet is known. Moreover, Patent Document 4 in which an active material is applied onto carbon foam is known. Furthermore, there is known Patent Document 5 which describes an electrode plate obtained by: forming a corrosion prevention layer of gold, silver, nickel, or the like on an electrically-conductive substrate made of plastic or glass fibers and covered with aluminum, magnesium, copper, or graphite; forming a lead plating layer in the an outermost layer; and then applying active material paste thereon. Moreover, as a conventional technique of reducing the thickness of the lead-acid battery, Non-patent Document listed below has been published. However, great reduction in weight and thickness cannot be sufficiently achieved by using these techniques.

PRIOR ART DOCUMENTS

Patent Documents

Patent Document 1: Japanese Patent Application Publication No. 2008-287909
Patent Document 2: Japanese Patent Application Publication No. Hei 05-343049
Patent Document 3: Japanese Patent Application Publication No. Hei 05-299094
Patent Document 4: Published Japanese Translation of PCT International Application No. 2005-531902, International Patent Application Publication No. WO2004/004027
Patent Document 5: U.S. Pat. No. 6,566,010

Non-Patent Document

Non-patent Document 1: Shin-Kobe Technical Report No. 019 (2009 February), a lead-acid battery using positive electrode plates and negative electrode plates obtained by applying active material paste onto a lead powder rolled sheet with a thickness of 0.2 mm reduced in thickness as a current collector, the lead-acid battery employed as a power source of an electric racing kart displayed in a booth of Hitachi, Ltd. in 2007 Tokyo Motor Show.

SUMMARY OF THE INVENTION

Problems to be Solved by the Invention

The aforementioned weight reduction methods involves only the reduction of a portion of the electrode plate group stripe, the utilization of the lead powder rolled sheet, the positive electrode plates, and the like, and are insufficient in terms of weight reduction of the lead-acid battery as a whole including weight reduction and thickness reduction of the positive electrode terminal, the negative electrode terminal, and the electrode plate group stripe in addition to the positive electrode plates and the negative electrode plates.

Moreover, as a measure for the aforementioned weight reduction and thickness reduction, it is conceivable to replace the conventional current collector made of lead alloy with a base member made of aluminum or aluminum alloy with low specific gravity and laminate a lead plating layer on a surface of the base member. However, this method has the following problem. Formation of pinholes on the surface of the base member in a plating step or the like cannot be suppressed and electrolyte solution which is dilute sulfuric acid corrodes the base member through the pinholes. Thus, desired discharging time cannot be obtained and such a plate is difficult to use as the electrode plate of the lead-acid battery.

Also in Patent Document 5 described above, in order to prevent pinholes from being formed in the lead plating layer and prevent dilute sulfuric acid from penetrating into the substrate through the pinholes, pinholes are buried by using peanut oil or the like after the lead plating and then the active material paste is applied. In other words, Patent Document 5 described above also has such a problem that the formation of pinholes cannot be suppressed and this makes the manufacturing step complex and makes the mass production difficult.

In view of the aforementioned disadvantages of the conventional technique, an object of the present invention is to, without fundamentally clinging to the conventional concept of the lead-acid battery manufacturing method and based on a new idea, provide an electrode body for a lead-acid battery which is reduced in weight and thickness and improved in durability by making a positive electrode plate and a negative electrode plate out of aluminum or aluminum alloy with low specific gravity and forming a plating layer of lead, lead alloy, or the like on surfaces of the electrode plates by using a plating technique and a lead-acid battery using this electrode body.

Means for Solving the Problems

In the present invention, in order to achieve the aforementioned object, the positive electrode plate or the negative electrode plate is made of aluminum or aluminum alloy and at least lead or lead alloy is uniformly laminated on a surface of the electrode plate to have a fixed thickness by using a plating method. Then, in order to provide a function as the positive electrode plate or the negative electrode plate, redox is repeated by periodically reversing a current in dilute sulfuric acid and a positive electrode or negative electrode active material is generated on a surface of the lead plating layer. The electrode plate is sufficiently washed with water and then dried and matured. The thus-obtained electrode plate forms a lead-acid battery as the positive electrode plate or the negative electrode plate. Note that a positive electrode terminal, a negative electrode terminal, and an electrode plate group stripe which are components other than the positive electrode plate and the negative electrode plate are manufactured similarly by using an aluminum material and a lead plating layer made of at least lead or lead alloy is laminated on surfaces thereof without electrolytic formation treatment using dilute sulfuric acid performed. The components thereby reduce the weight of the lead-acid battery as a whole as lead-plated parts.

Moreover, in the present invention, a solder plating layer with a film thickness of 10 µm or more is formed on a surface of a base member made of aluminum or aluminum alloy as a pinhole prevention layer and the lead plating layer with the fixed film thickness is laminated on a surface of the solder plating layer. Thereafter, redox is repeated by periodically reversing a current in dilute sulfuric acid and a positive electrode plate or a negative electrode plate in which a positive electrode or negative electrode active material is generated on the surface of the lead plating layer is formed. Note that a positive electrode terminal, a negative electrode terminal, and an electrode plate group stripe which are components of the lead-acid battery other than the positive electrode plate and the negative electrode plate are manufactured similarly by using an aluminum material and a solder plating layer and a lead plating layer are formed on surfaces thereof without electrolytic formation treatment using dilute sulfuric acid performed. The components thereby reduce the weight of the lead-acid battery as a whole as lead-plated parts.

Moreover, in the present invention, a tin plating layer made of tin being a group 4 metal or tin-lead alloy is formed on the surface of the base member made of aluminum or aluminum alloy as the pinhole prevention layer and the solder plating layer and the lead plating layer with a fixed film thickness are laminated on a surface of the tin plating layer. Thereafter, in order to provide a function as the positive electrode plate or the negative electrode plate, redox is repeated by periodically reversing a current in dilute sulfuric acid and a positive electrode plate or a negative electrode plate in which a positive electrode or negative electrode active material is generated on the surface of the lead plating layer is formed. Note that a positive electrode terminal, a negative electrode terminal, and an electrode plate group stripe which are components of the lead-acid battery other than the positive electrode plate and the negative electrode plate are manufactured similarly by using an aluminum material and a tin plating layer, a solder plating layer, and a lead plating layer are formed on surfaces thereof without electrolytic formation treatment using dilute sulfuric acid performed. The components thereby reduce the weight of the lead-acid battery as a whole as lead-plated parts.

Effects of the Invention

As apparent from the aforementioned explanation, the effects given below can be obtained from the present invention.

(1) Since the positive electrode plate, the negative electrode plate, the positive electrode terminal, the negative electrode terminal, and the electrode plate group stripe are made of aluminum or aluminum alloy with low specific gravity and aluminum surfaces of these components are protected by uniformly laminating the lead plating layer made of at least lead or lead alloy on the surfaces, the weight reduction can be achieved. Moreover, the positive electrode plate and the negative electrode plate are each subjected to electrolytic formation treatment using dilute sulfuric acid after the lead plating to generate a positive electrode active material or a negative electrode active material and are thereby provided with the charging and discharging properties. Furthermore, thickness reduction of the positive electrode plate and the negative electrode plate enables volume reduction of the cell and a usage amount of sulfuric acid with specific gravity of 1.01 to 1.30, preferably sulfuric acid with specific gravity of 1.25 to 1.30 can be thus reduced. Accordingly, it is possible to reduce the volume of the entire lead-acid battery and achieve overall mass reduction. Moreover, this technique is a groundbreaking method in which, without fundamentally clinging to the existing conventional concepts, the usage amount of lead in the lead-acid battery is reduced by plating the light aluminum surface with lead or lead alloy and in which the positive electrode active material or the negative electrode active material is formed on the surface by periodically reversing the polarities in the dilute sulfuric acid solution after the plating.

(2) The positive electrode plate and the negative electrode plate are each manufactured by laminating the lead plating layer made of at least lead or lead alloy which is a component of the active material, on an aluminum or aluminum alloy thin plate by using the plating technique. Moreover, the lead plating layer made of lead or lead alloy turns into an electrochemically strong laminated surface film and the positive electrode active material or the negative electrode active material can be prevented from falling off due to vibration or the like compared to the conventional method in which a lead alloy lattice is filled with a kneaded active material and the active material is hardened. Accordingly, it is possible to improve the durability of the positive electrode plate and the negative electrode plate. Moreover, replacing the conventional lead alloy current collector with aluminum or aluminum alloy with low specific gravity can reduce weight. Furthermore, the lead plating film laminated on the surface can be used as the positive electrode active material or the negative electrode active material by being subjected to electrolytic formation treatment. Accordingly, it is possible to achieve great weight reduction and to simplify the manufacturing from the conventional method in which lead powder is kneaded and the lead alloy lattice is filled with the kneaded lead powder.

(3) In a plating step and a plating apparatus, plating liquid is collected into a collection tank by free fall after the plating. Moreover, a liquid collected in spray cleaning in the following step is concentrated and returned to the collection tank to be concentrated again. This can reduce dilution due to taking-in of cleaning water from the previous step and enables collection and reuse of a lead compound. Thus, resources can be saved.

(4) The solder plating layer for preventing formation of pinholes is formed on the surface of the base member made of aluminum or aluminum alloy. Setting the film thickness of the solder plating layer to at least 10 μm or more causes a recess portion made by a dent or a scratch formed on the surface of the base member to be appropriately buried by the solder plating layer and prevents pinholes from being formed in the lead plating layer. As a result, dilute sulfuric acid used in the step of generating the active material and dilute sulfuric acid serving as the electrolyte solution in use of the lead-acid battery are prevented from corroding the base member through the pinholes and it is possible to achieve weight reduction and thickness reduction of the positive electrode plate and the negative electrode plate and achieve an improvement in the energy density per mass of the lead-acid battery.

(5) A tin plating layer, made of tin which is a group 4 metal or tin-lead alloy, for preventing formation of pinholes is formed on the surface of the base member made of aluminum or aluminum alloy. The tin plating layer is a film with excellent covering property (burying property) and setting the film thickness of the tin plating layer to 1 μm or more causes the recess portion made by a dent or a scratch formed on the surface of the base member to be appropriately buried by the tin plating layer and prevents pinholes from being formed in the lead plating layer. As a result, dilute sulfuric acid used in the step of generating the active material and dilute sulfuric acid serving as the electrolyte solution in use of the lead-acid battery are prevented from corroding the base member through the pinholes and it is possible to achieve weight reduction and thickness reduction of the positive electrode plate and the negative electrode plate and achieve an improvement in the energy density per mass of the lead-acid battery.

(6) In the lead plating layer formed on the surface of the base member, at least two plating layers are formed to be laminated one on top of the other and the lower lead plating layer is a fine plating layer and the upper lead plating layer is a coarse plating layer. In the laminated structure of the lead plating layers, the lower fine lead plating layer can improve the adhesion and the corrosion resistance of the plating layers and the upper coarse lead plating layer can increase the surface area of the active material layer and improve the charging and discharging performances.

BRIEF DESCRIPTION OF THE DRAWINGS

FIG. 14 is a table explaining a discharging test of a lead-acid battery using the electrode body for a lead-acid battery in the second embodiment of the present invention.

FIG. 16 is a table explaining a discharging test of a lead-acid battery using the electrode body for a lead-acid battery in the third embodiment of the present invention.

MODES FOR CARRYING OUT THE INVENTION

Figure 1:
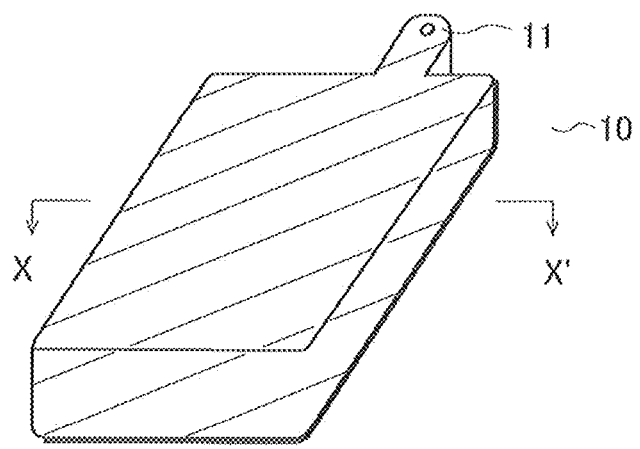
FIG. 1 is a perspective view explaining an electrode plate formed by laminating lead plating layers on a thin plate made of aluminum or aluminum alloy material in a first embodiment of the present invention.
Figure 2:
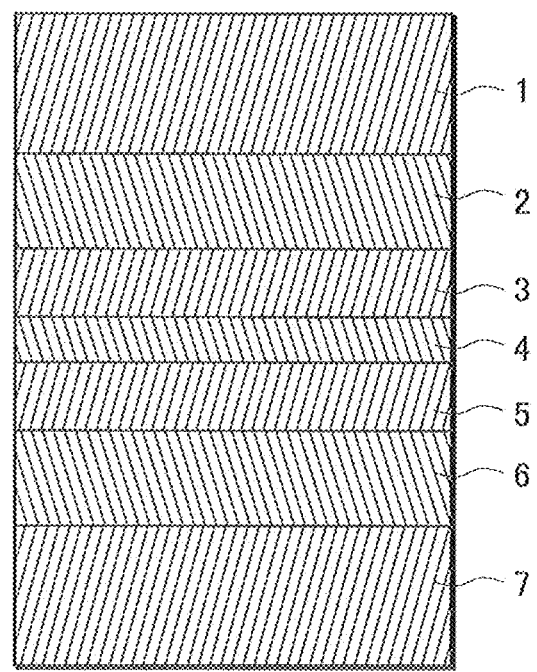
FIG. 2 is a cross-sectional view explaining the lead plating layers laminated on the thin plate made of aluminum or aluminum alloy material in the first embodiment of the present invention.

Although steps in a first embodiment of the present invention are described below, a plating method is not limited to the steps of the present invention as long as the plating method does not depart from the spirit of the invention. Note that, in an electrode plate 11 illustrated in FIGS. 1 and 2, reference numeral 1 denotes a lead plating layer with a rough composition, reference numeral 2 denotes a lead plating layer with a fine composition, reference numeral 3 denotes lead alloy plating layer with a fine composition, reference numeral 4 denotes a thin plate made of aluminum or aluminum alloy material, reference numeral 5 denotes the lead alloy plating layer with the fine composition, reference numeral 6 denotes the lead plating layer with the fine composition, and reference numeral 7 denotes the lead plating layer with the rough composition. Moreover, in FIG. 3, reference numeral 4 denotes the thin plate made of aluminum or aluminum alloy material, reference numeral 3 denotes the fine lead alloy plating layer, reference numeral 2 denotes the fine lead plating layer, reference numeral 1 denotes the coarse lead plating layer for increasing the surface area, reference numeral 8 is a positive electrode active material generation layer formed by anodic electrolysis of dilute sulfuric acid, and reference numeral 9 is a negative electrode active material generation layer formed by cathodic electrolysis of dilute sulfuric acid. Note that fine in the embodiment means that a plating crystal particle size is small, plating crystal particle size means an average value of outer diameters of plating particles obtained by electrodeposition, fine plating layer means a plating layer with a plating crystal particle size of 50 nm or more and less than 5 μm, preferably 1 μm or less, and coarse plating layer means a plating layer with a plating crystal particle size of 5 μm or more and less than 50 μm.

Note that, in the following description, pure aluminum with a series number of A1050 or A1100 or aluminum alloy with a series number of A5052, A5058, A6061, or A7075 produced by Nippon Light Metal Co., Ltd, UACJ Corporation, Mitsubishi Aluminum Co., Ltd., Kobe Steel, Ltd., or Showa Denko K.K. is used as the aforementioned aluminum or aluminum alloy.

(Step 1)

Figure 3:
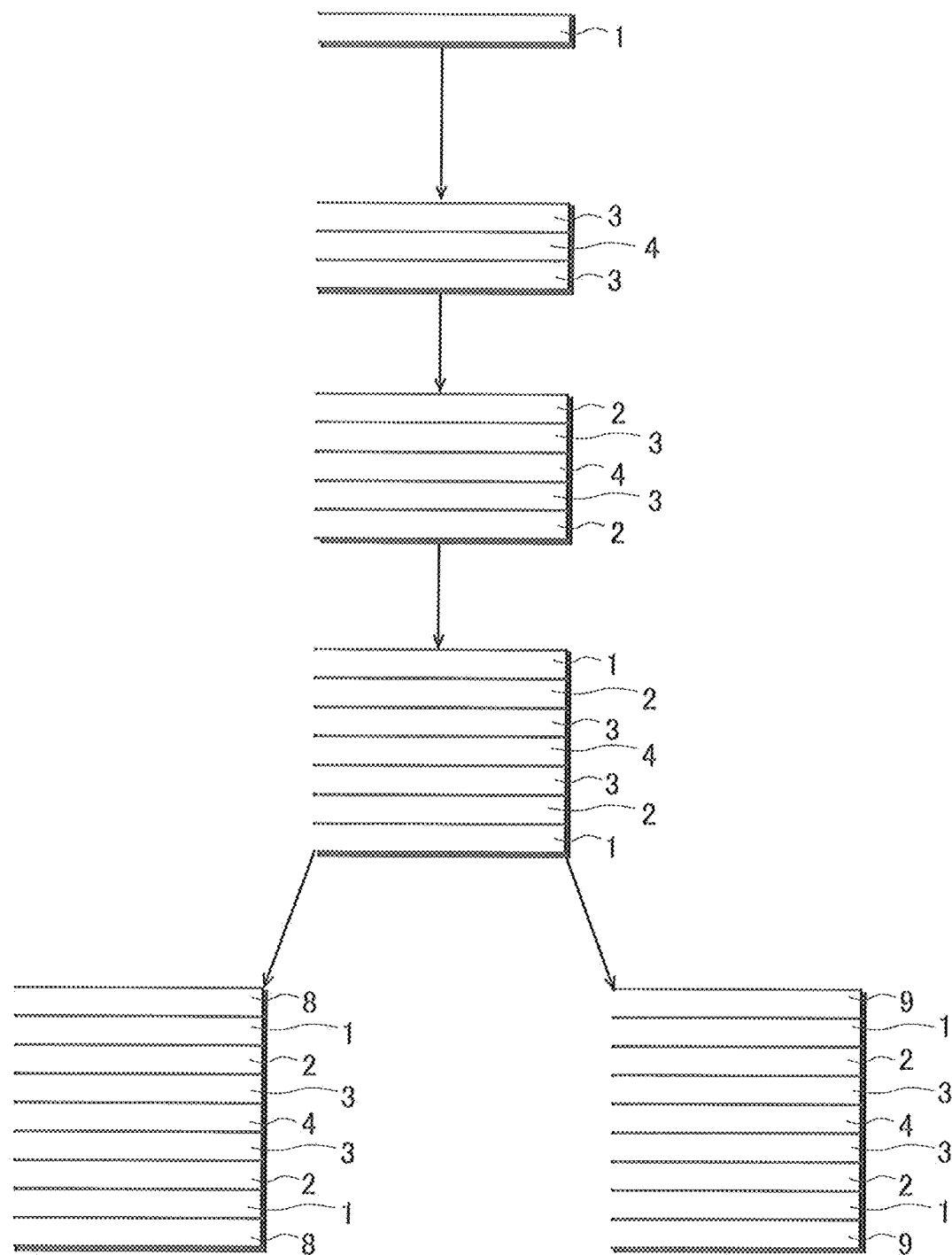
FIG. 3 is a view explaining steps from lead plating and lead alloy plating to active material generation by dilute sulfuric acid electrolysis in the first embodiment of the present invention.
Figure 4:
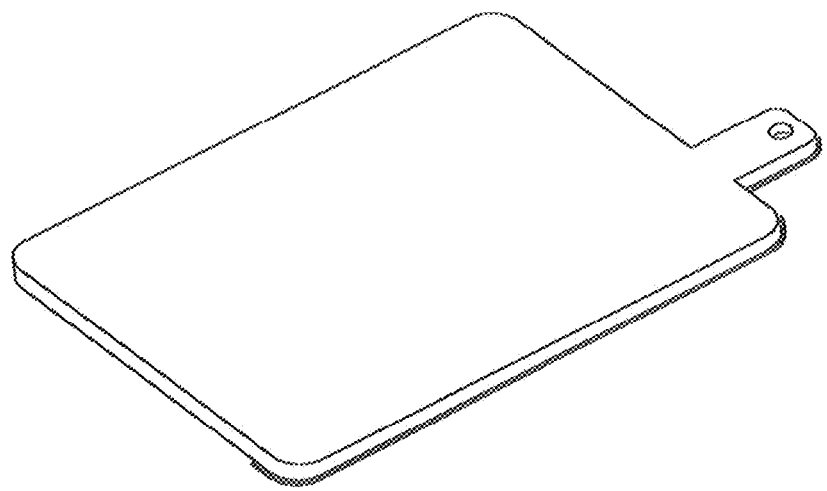
FIG. 4 is a perspective view explaining a plate for forming the electrode made of aluminum or aluminum alloy material in the first embodiment of the present invention.

The electrode plate is manufactured by using an aluminum plate of FIG. 4 and, in an inner portion of the plating layers, a plating layer made of lead or lead alloy with fine compositions is formed by performing processes of FIG. 3 to improve the adhesion and corrosion resistance. In an outer portion of the plating layers, a plating layer which is made of lead or lead alloy and which is rough and has a large surface area is formed to improve charging and discharging performances.

(Step 2)

Generally, a surface of aluminum is covered with a strong oxide layer and a plating layer cannot be attached thereto with good adhesion. Accordingly, before the formation of the plating layer made of lead or lead alloy, appropriate surface preparation is performed on the aluminum surface to improve the adhesion of the plating layer. A method such as anodization, electroless nickel plating, or tin substitution plating can be selected as the surface preparation. In this step, the electroless nickel plating is employed to activate a plating surface and improve the adhesion of the lead plating layer made of lead or lead alloy.

(Step 3)

The aluminum plate subjected to the surface preparation is immersed in one of plating baths of a fluorosilicate bath, a fluoborate bath, and an organic acid bath or a combination of two or more of these plating baths. In this example, multiple fluoborate baths varying in concentration are used and a plating bath to which an organic additive such as gelatin or peptone is added by 0.1 g/L to 5 g/L to improve uniform electrodeposition properties is used. Then, the plate is rocked in an up-down direction while the bath is uniformly agitated with a current applied for 60 minutes to 150 minutes at a current density of 0.5 $A/dm^2$ to 20 $A/dm^2$ by using lead with a purity of 99.99% or lead alloy as an anode. A pinhole-free lead plating layer is thereby laminated on the aluminum plate. Although the lead plating layer of at least lead or lead alloy can be laminated to have a thickness of 200 μm or more by changing the concentration, the current application time, the temperature, the current density, and the current waveform, the plating thickness is set to 30 μm to 200 μm in both of the positive electrode plate and the negative electrode plate in consideration of the uniformness of the surface and an increase in mass. A positive electrode terminal, a negative electrode terminal, and an electrode plate group stripe are also formed to have a similar plating thickness.

In this case, the lead plating layer made of lead is a plating layer having a metal composition containing lead at a purity of 99.99% or more and the lead plating layer made of lead alloy is a plating layer having a metal composition containing lead at a purity of 95% or more, preferably, a plating layer having a metal composition containing lead at a purity of 97% or more, and more preferably a plating layer having a metal composition containing lead at a purity of 99% at maximum. The same applies to the following description.

(Step 4)

In the laminated lead plating layers of at least lead or lead alloy, a final plating surface is formed to be a coarse lead film to increase the surface area. The charging and discharging performances of the positive electrode active material or the negative electrode active material to be generated by electrolytic formation treatment using dilute sulfuric acid are thereby improved. As a method of electrolytic formation treatment for generating the positive electrode active material or the negative electrode active material after the plating, a current is continuously applied at a current density of 0.1 $A/dm^2$ to 10 $A/dm^2$ by using a lead plate or an insoluble electrode in dilute sulfuric acid with specific gravity of 1.01 to 1.30. Then, the current is reversed every 6 hours to 12 hours. In the case of the positive electrode plate, the final current application is finished with the electrode plate being the anode and a dark brown positive electrode active material is thereby made to deposit on the surface of the lead plating layer. In the case of the negative electrode plate, the final current application is performed in a similar method with the electrode plate being the cathode and a gray negative electrode active material is thereby made to deposit on the surface of the lead plating layer. The positive electrode plate or the negative electrode plate on which the active material is generated is sufficiently washed under running water and dried by hot air. Then, the plate is left as it is for 24 hours or more to be matured and the positive electrode plate or the negative electrode plate is thus obtained.

(Step 5)

The positive electrode terminal, the negative electrode terminal, and the electrode plate group stripe are subjected to plating similar to that for the negative electrode plate to provide resistance against corrosion caused by dilute sulfuric acid mist and are not subjected to the electrolytic formation treatment.

(Step 6)

Five positive electrode plates on which the positive electrode active material is generated are each covered with a separator and the positive electrode plates and six negative electrode plates on which the negative electrode active material is generated are alternately stacked one on top of another. The positive electrode terminal and the negative electrode terminal are attached to the thus-stacked body to form a single cell. Dilute sulfuric acid with specific gravity of 1.01 to 1.30 is injected into the single cell and the single cell is left as it is until heat generation stops. Then the cell is charged for 24 hour or more at a constant voltage of 2.2 V to 2.7 V and a single cell battery with a nominal voltage of 2 V is thus manufactured.

(Step 7)

Figure 8:
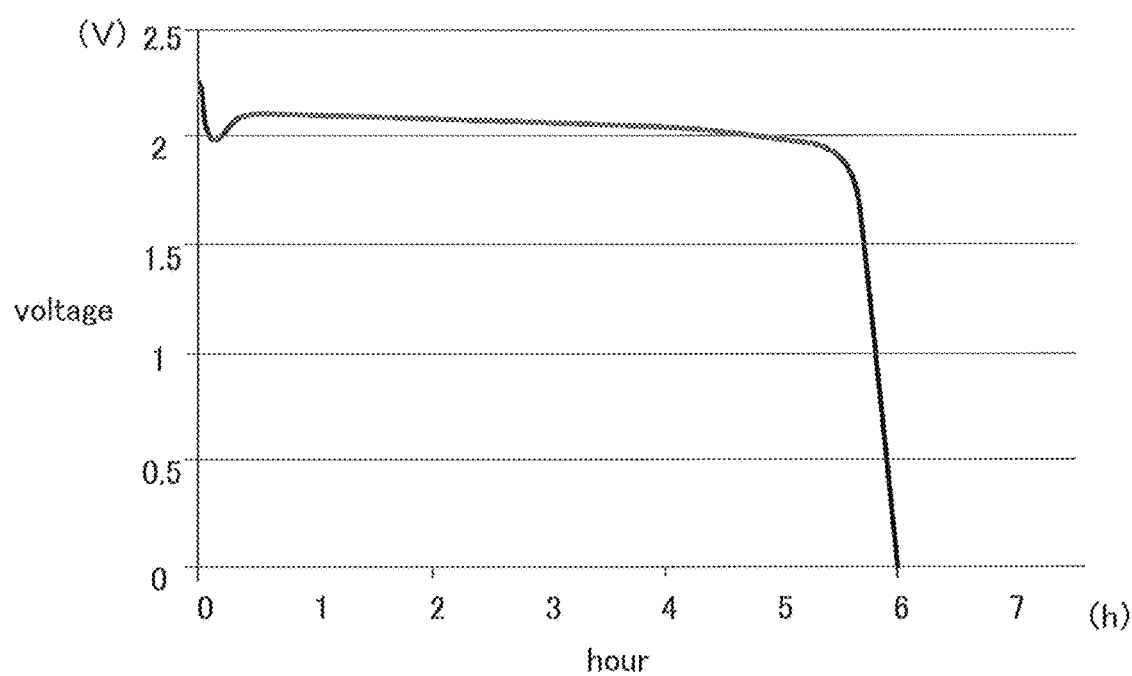
FIG. 8 is a graph illustrating changes in voltage and time when a single cell is discharged in the first embodiment of the present invention, the single cell created by covering five positive electrodes respectively with separators and combining the positive electrodes alternately with six negative electrodes.

As illustrated in FIG. 8, after the completion of charging, a discharging test is performed by connecting a light bulb of 2.5V, 0.5 A to the aforementioned single cell and lighting the light bulb.

Example 1

The mass of the plate in the case where lead alloy (solder plating layer) and lead (lead plating layer) were laminated 5.2 μm on the aluminum plate of FIG. 4 with a plate thickness of 0.2 mm and a mass of 5.98 g was 7.17 g and the plate thickness was 0.21 mm. The mass increase was 1.19 g and the plate thickness increase was 0.01 mm.

Example 2

The mass of the plate in the case where lead alloy (solder plating layer) and lead (lead plating layer) were laminated 10.1 μm on the aluminum plate of FIG. 4 with a plate thickness of 0.2 mm and a mass of 5.98 g in a similar method was 8.33 g and the plate thickness was 0.22 mm. The mass increase was 2.35 g and the plate thickness increase was 0.02 mm.

Example 3

The mass of the plate in the case where lead alloy (solder plating layer) and lead (lead plating layer) were laminated 20.3 μm on the aluminum plate of FIG. 4 with a plate thickness of 0.2 mm and a mass of 5.98 g in a similar method was 10.91 g and the plate thickness was 0.24 mm. The mass increase was 4.93 g and the plate thickness increase was 0.04 mm.

Example 4

The mass of the plate in the case where lead alloy (solder plating layer) and lead (lead plating layer) were laminated 30.5 μm on the aluminum plate of FIG. 4 with a plate thickness of 0.2 mm and a mass of 5.98 g in a similar method was 13.42 g and the plate thickness was 0.26 mm. The mass increase was 7.44 g and the plate thickness increase was 0.06 mm.

Example 5

The mass of the plate in the case where lead alloy (solder plating layer) and lead (lead plating layer) were laminated 51.2 μm on the aluminum plate of FIG. 4 with a plate thickness of 0.2 mm and a mass of 5.98 g in a similar method was 18.54 g and the plate thickness was 0.30 mm. The mass increase was 12.56 g and the plate thickness increase was 0.1 mm.

Example 6

The mass of the plate in the case where lead alloy (solder plating layer) and lead (lead plating layer) were laminated 82.4 μm on the aluminum plate of FIG. 4 with a plate thickness of 0.2 mm and a mass of 5.98 g in a similar method was 26.25 g and the plate thickness was 0.36 mm. The mass increase was 20.27 g and the plate thickness increase was 0.16 mm.

Example 7

The mass of the plate in the case where lead alloy (solder plating layer) and lead (lead plating layer) were laminated 107.6 μm on the aluminum plate of FIG. 4 with a plate thickness of 0.2 mm and a mass of 5.98 g in a similar method was 32.44 g and the plate thickness was 0.42 mm. The mass increase was 26.46 g and the plate thickness increase was 0.22 mm.

COMPARATIVE EXAMPLES

The specific gravities of the aluminum plate and lead used in the examples are illustrated in Table 1.

TABLE 1

| Specific Gravities of Metal Aluminum and Metal Lead | |
| --- | --- |
| Metal Aluminum | Metal Lead |
| 2.70 | 11.34 |

Comparative Example 1

The average masses and plate thicknesses of paste-type positive electrode plates and negative electrode plates in current lead-acid batteries are illustrated in Table 2.

TABLE 2

Average Weights and Plate Thicknesses of Paste-Type Positive
Electrode Plates and Negative Electrode Plates

| | Positive Electrode Plate | | Negative Electrode Plate | | |
|---|---|---|---|---|---|
| | Thickness | Weight | | Thickness | Weight |
| Comparative Example 1 | 1.17 mm | 83 g | Comparative Example 6 | 1.15 mm | 69 g |
| Comparative Example 2 | 1.18 mm | 83 g | Comparative Example 7 | 1.16 mm | 77 g |
| Comparative Example 3 | 1.17 mm | 84 g | Comparative Example 8 | 1.16 mm | 77 g |
| Comparative Example 4 | 1.19 mm | 85 g | Comparative Example 9 | 1.15 mm | 70 g |
| Comparative Example 5 | 1.17 mm | 84 g | Comparative Example 10 | 1.16 mm | 76 g |

Comparative Example 2

The average mass and average plate thickness of the current paste-type positive electrode plates (Comparative Examples 1 to 5) and negative electrode plates (Comparative Examples 6 to 10) are compared with those of the aluminum thin plate subjected to the lead plating in Example 4 by using Table 2. The average mass of the paste-type positive electrode plates is 83.8 g and the plate thickness thereof is 1.156 mm. Meanwhile, in the electrode plate of Example 4 to which lead alloy (solder plating layer) and lead (lead plating layer) are attached, the average mass is 32.44 g and the plate thickness is 0.42 mm and the weight and thickness are reduced. The negative electrode plates are compared with Example 4 and weight reduction from the average mass of 73.8 g to 32.44 g and thickness reduction from the plate thickness of 1.156 mm to 0.42 mm are achieved.

Figure 5:
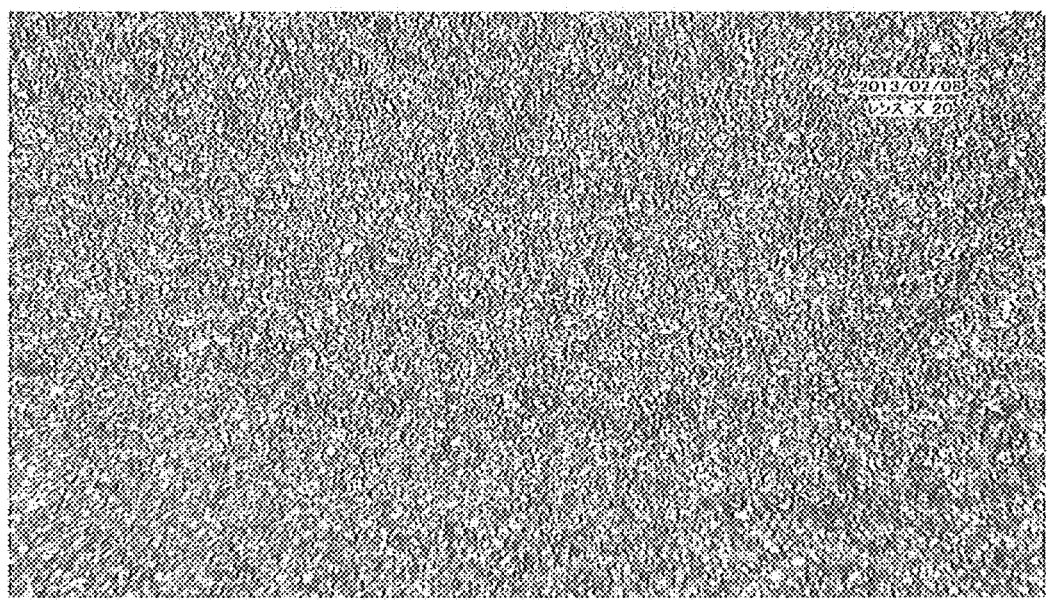
FIG. 5 is a drawing-substituting photograph in which a pinhole-free surface of the laminated lead plating layer in the first embodiment of the present invention is magnified 200 times.
Figure 6:
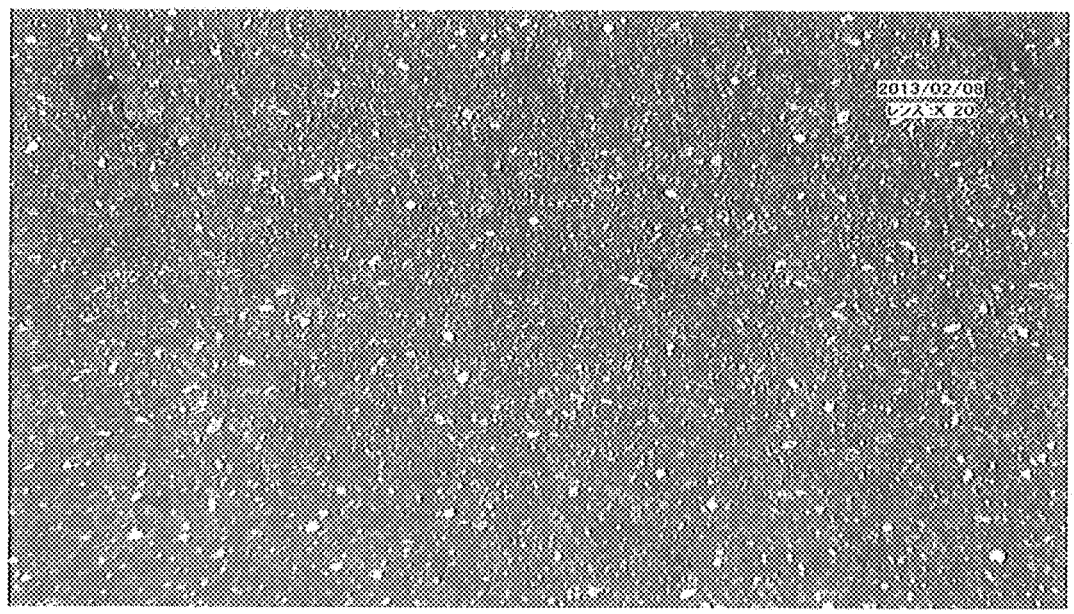
FIG. 6 is a drawing-substituting photograph in which a surface of a positive electrode formed by anodic electrolysis in dilute sulfuric acid after lead plating in the first embodiment of the present invention is magnified 200 times.
Figure 7:
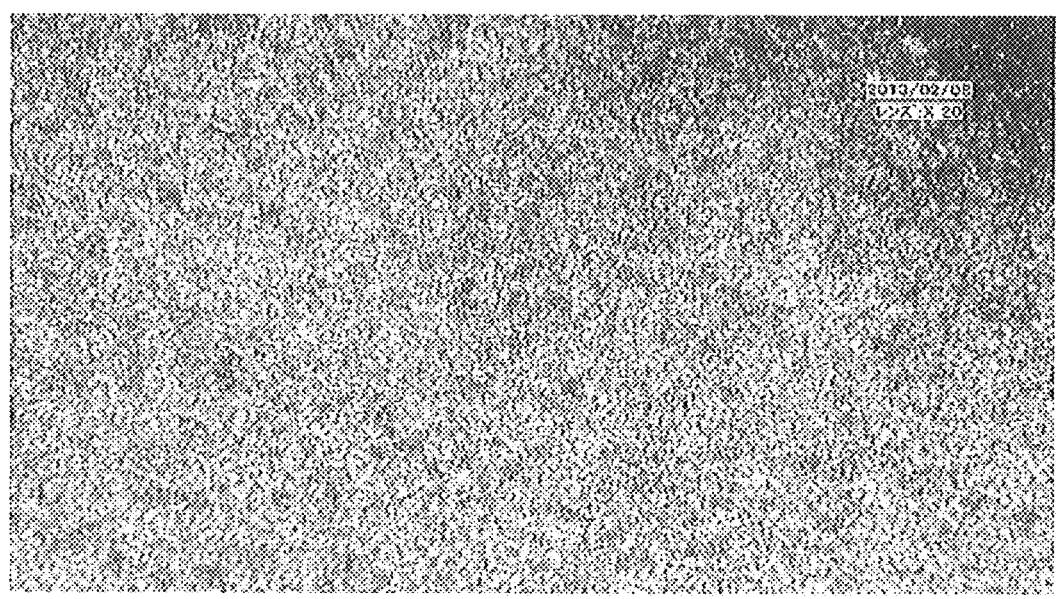
FIG. 7 is a drawing-substituting photograph in which a surface of a negative electrode formed by cathodic electrolysis in dilute sulfuric acid after lead plating in the first embodiment of the present invention is magnified 200 times.
Figure 9:
FIG. 9 is a drawing-substituting photograph in which a normal lead surface used as a comparative example of the first embodiment of the present invention is magnified 200 times.
Figure 10:
FIG. 10 is a drawing-substituting photograph in which a surface of a positive electrode of Strong Series Battery SXG40B19 manufactured by Shin-kobe Electric Machinery Co., Ltd. used as a comparative example of the first embodiment of the present invention is magnified 200 times.
Figure 11:
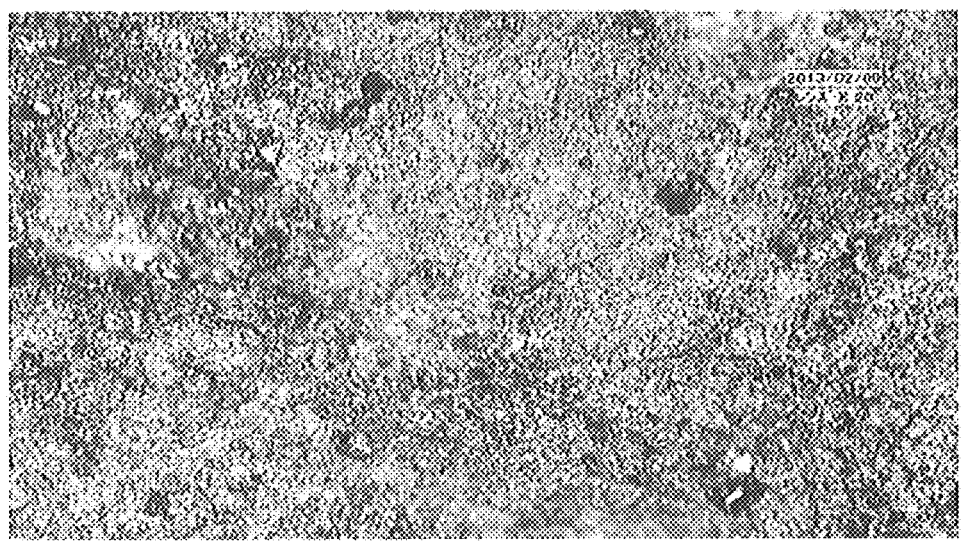
FIG. 11 is a drawing-substituting photograph in which a surface of an anode electrode of a Strong Series Battery SXG40B19 manufactured by Shin-kobe Electric Machinery Co., Ltd. used as a comparative example of the first embodiment of the present invention is magnified 200 times.
Figure 12:
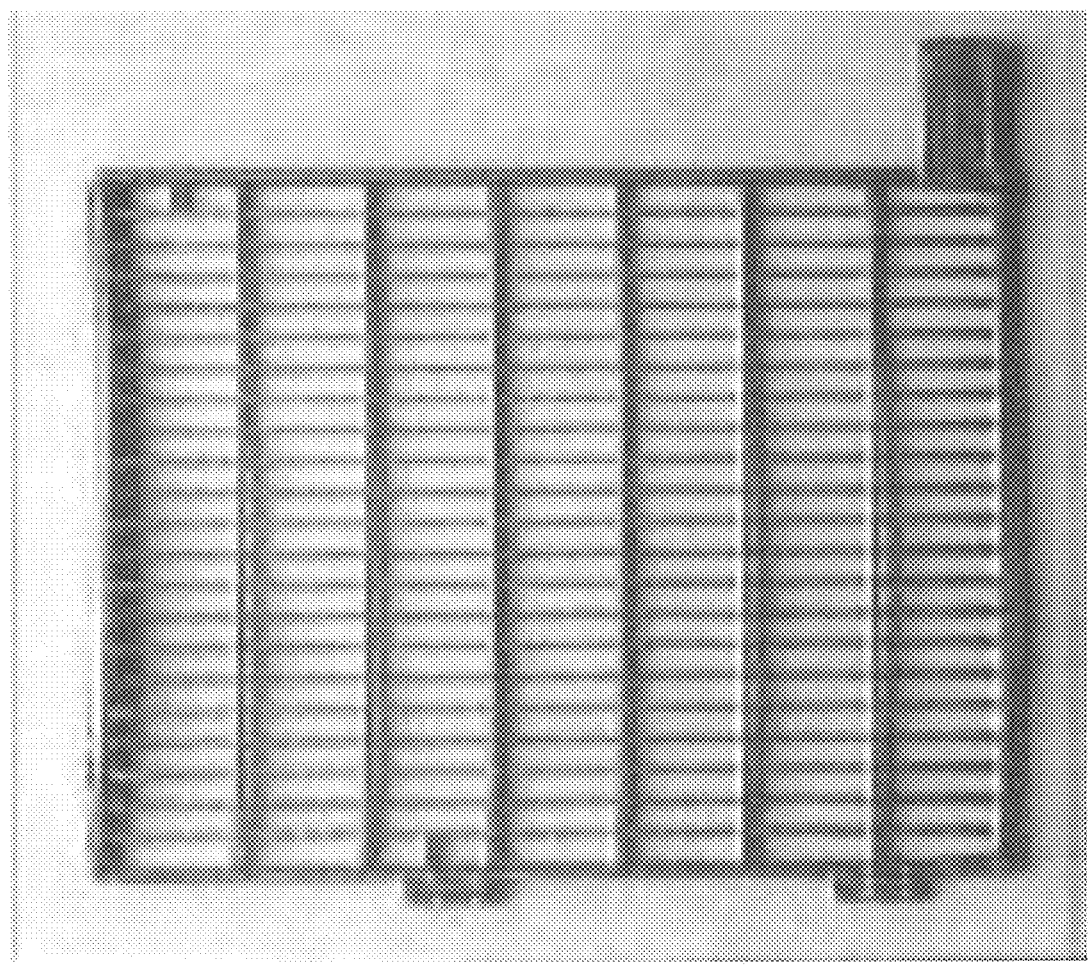
FIG. 12 is a drawing-substituting photograph of an electrode lattice made of lead antimony alloy before filling of lead paste in a conventional technique used as a comparative example of the first embodiment of the present invention.

The surface of the lead plating layer in FIG. 5 had a greater surface area than a current lead plate surface in FIG. 9. Accordingly, the surface areas of the positive electrode active material and the negative electrode active material generated in the positive electrode plate and the negative electrode plate after the electrolytic formation treatment also increased and the discharging time in a state where the single cell was assembled increased by 18% in comparison with the positive electrode plate and the negative electrode plate formed of the lead plates.

Next, an electrode body 21 of a lead-acid battery according to a second embodiment of the present invention is described in detail based on the drawings. Note that, in the description of the embodiment, the same members are denoted by the same reference numerals in principle and overlapping description is omitted. Moreover, in the following description, the first embodiment described by using FIGS. 1 to 12 is referred to as appropriate.

Figure 13A:
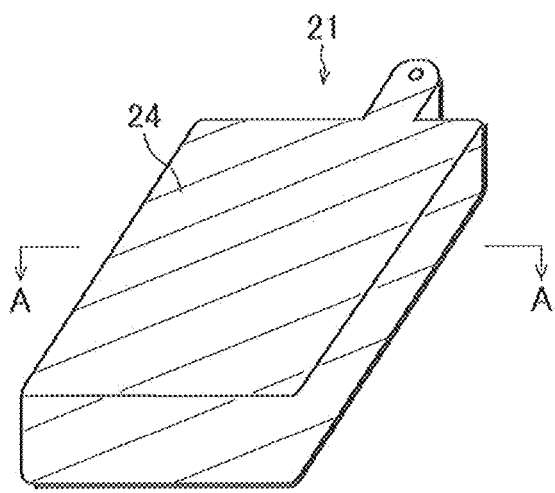
FIGS. 13A and 13B are a perspective view and a cross-sectional view, respectively, explaining an electrode body for a lead-acid battery in a second embodiment of the present invention.
Figure 13B:
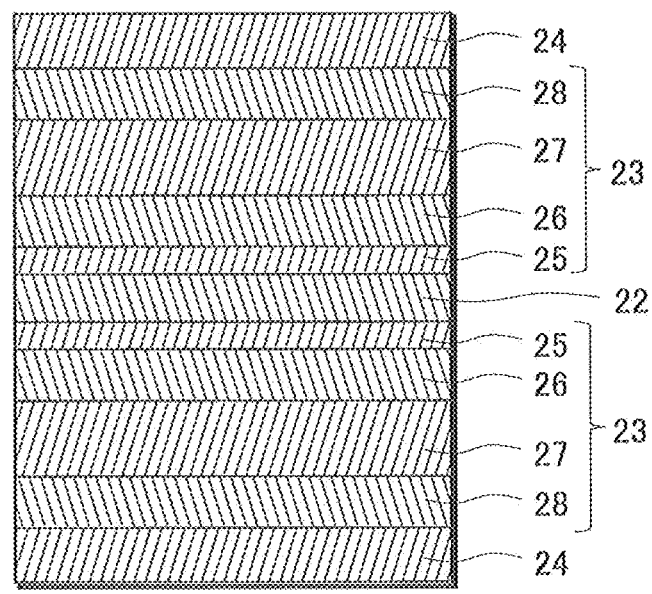

FIG. 13A is a perspective view explaining the electrode body 21 of the lead-acid battery in the embodiment. FIG. 13B is a cross-sectional view of the electrode body 21 in the line A-A direction illustrated in FIG. 13A.

As illustrated in FIG. 13A, a plate-shaped base member 22 (see FIG. 13B) having a shape illustrated in FIG. 4 and made of aluminum or aluminum alloy is used for the electrode body 21. The base member 22 has, for example, a plate thickness of 0.2 mm and a mass of 5.98 g. Note that the plate thickness of the base member 22 only needs to be 0.15 mm or more and is preferably 1.0 mm or less from the viewpoint of weight reduction of the electrode body.

Multiple plating layers 23 (see FIG. 13B) are formed on a surface of the base member 22. First and second lead plating layers 27, 28 (see FIG. 13B) located in an outer surface portion of the multiple plating layers 23 are subjected to electrolytic formation treatment to form an active material layer 24. In this case, the first and second lead plating layers 27, 28 are plating layers obtained by laminating lead plating layers made of at least lead or lead alloy by using a plating technique as in the aforementioned first embodiment.

The electrode body 21 is used as the positive electrode plate or the negative electrode plate of the lead-acid battery. When the electrode body 21 is used as the positive electrode plate, the active material layer 24 is a dark brown positive electrode active material layer. When the electrode body 21 is used as the negative electrode plate, the active material layer 24 is a gray negative electrode active material layer. Moreover, the surface roughness Ra of the second lead plating layer 28 is 0.500 μm or more and 40.000 μm or less. Due to this structure, the active material layer 24 formed on the second lead plating layer 28 has a large surface area and the charging and discharging performances of the lead-acid battery are improved.

As illustrated in FIG. 13B, the electrode body 21 includes the base member 22, a nickel plating layer 25 covering the surface of the base member 22, a solder plating layer 26 covering a surface of the nickel plating layer 25, the first lead plating layer 27 covering a surface of the solder plating layer 26 and having a fine metal composition, the coarse second lead plating layer 28 covering a surface of the first lead plating layer 27 and having a rougher metal composition than the first lead plating layer 27, and the active material layer 24 formed by at least partially subjecting the first and second lead plating layers 27, 28 to the electrolytic formation treatment. Note that the solder plating layer 26 in the embodiment is a plating layer having such a metal composition that the ratio (mass ratio) of lead to tin is 9:1 at maximum and 5:5 at minimum.

As described above in the first embodiment, in a conventional lead-acid battery, a current collector lattice made of lead alloy is used as a frame of the electrode plate. Moreover, spaces in the current collector lattice are filled with, as the active material, paste obtained by kneading lead powder made of lead oxide and metal lead with water and dilute sulfuric acid or a paste obtained by kneading these substances with a reinforcement agent such as fibers.

In the conventional lead-acid battery, the greater the amount of the aforementioned paste-form active material is, the better the charging and discharging performances of the lead-acid battery are. Accordingly, the current collector lattice is made thicker to hold as much paste-form active material as possible. In the embodiment of the present invention, the base member 22 of the electrode body 21 is changed from the conventional current collector lattice made of lead alloy to one made of aluminum or aluminum alloy with small specific gravity to achieve the mass and thickness reduction of each electrode body 21.

Specifically, in the conventional lead-acid battery, there is no idea of manufacturing the positive electrode plate and the negative electrode plate by using a thin-film aluminum base member and forming multiple plating layers on the aluminum base member by a wet plating technique. This is due to presence of the following major problem. In the process of plating, pinholes are formed in the first and second lead plating layers 27, 28 and this causes dilute sulfuric acid to corrode the base member 22 made of aluminum or the like through the pinholes. As a result, discharging time sufficient as a lead-acid battery cannot be achieved. However, in the conventional technique, the formation of pinholes cannot be suppressed during the plating and the like in a mass-production process of the positive electrode plate and the like.

Accordingly, in the embodiment, the solder plating layer 26 is formed as a measure against the pinholes in the multiple plating layers 23 on the surface of the base member 22. Although described in detail later, the solder plating layer 26 is formed to have a film thickness of at least 10 μm or more.

The present inventors focused on presence of a recess portion made by a dent or a scratch formed on the base member 22 in transport or manufacturing processing, as a mechanism forming the pinholes. The base member 22 is a soft-material thin plate member made of aluminum or aluminum alloy and the aforementioned recess portion is likely to be formed. It was found that, when the multiple plating layers 23 are formed on the surface of the base member 22 with the recess portion formed on the surface of the base member 22, the recess portion cannot be sufficiently buried by the solder plating layer 26 if the film thickness of the solder plating layer 26 is less than 10 μm, and the pinholes are formed above the recess portion in the first and second lead plating layers 27, 28.

FIG. 14 illustrates a result of a test in which single cells with the same structure as one used in the discharging test described by using FIG. 8 were formed and a discharging test was performed. Specifically, five positive electrode plates in which the active material layers 24 of the electrode bodies 21 were the positive electrode active material layers were prepared and were each covered with a separator. Meanwhile, six negative electrode plates in which the active material layers 24 of the electrode bodies 21 were the negative electrode active material layers were prepared. Then, the aforementioned positive electrode plates and the negative electrode plates are alternately stacked and the positive electrode terminal and the negative electrode terminal were attached to the stacked body to form the single cell. Dilute sulfuric acid with specific gravity of 1.01 to 1.30 was injected into the single cell and the single cell was left as it is until heat generation stopped. Then the cell was charged for 24 hour or more at a constant voltage of 2.2 V to 2.7 V and a single cell battery with a nominal voltage of 2 V was thus manufactured. After the completion of charging, the discharging test was performed by connecting a light bulb of 2.5V, 0.5 A to the aforementioned single cell and lighting the light bulb.

The laminated plating film thickness illustrated in FIG. 14 is a film thickness of the laminated solder plating layer 26, first lead plating layer 27, and second lead plating layer 28. In the embodiment, these layers are manufactured such that the film thickness ratio of solder plating layer 26:first lead plating layer 27:second lead plating layer 28=1:1:1.5. Note that the film thickness ratio in the electrode body 21 is not limited to this film thickness ratio and any design change can be made depending on the battery capacity and specifications of the lead-acid battery and the like.

As illustrated in FIG. 14, in Examples 8 to 10, in Example 10, the film thickness of the solder plating layer 26 is 6.2 μm at maximum according to the aforementioned film thickness ratio and the film thickness of the solder plating layer 26 is less than 10 μm. In this case, pinholes were formed in at least one of the positive electrode plate and the negative electrode plate and the discharging times of Examples 8 to 10 were 24 minutes, 46 minutes, and 68 minutes, respectively, and Examples 8 to 10 failed to achieve a sufficient discharging time. This is due to the following reason. As described above, dilute sulfuric acid in the step of generating the active material layer 24 or dilute sulfuric acid in the discharging testing enters from the pinholes and dissolves the nickel plating layer 25 and the solder plating layer 26 below the pinholes to corrode the base member 22. As a result, a leak current is generated from a corrosion region of the base member 22 and the capacity as a lead-acid battery decreases.

Moreover, in Examples 11 to 18, in Example 11, the film thickness of the solder plating layer 26 is 8.0 μm at minimum and 9.1 μm at maximum according to the aforementioned film thickness and is less than 10 μm. However, the formation of pinholes was suppressed. Moreover, in Example 12, the film thickness of the solder plating layer 26 is 13.7 μm at minimum and 14.8 μm at maximum and is 10 μm or more. In this case, the formation of pinholes was suppressed. Although the formation of pinholes can be suppressed even when the film thickness of the solder plating layer 26 is less than 10 μm as in Example 11, the film thickness of the solder plating layer 26 is preferably 10 μm or more in consideration of defects occurring in mass production. It is also found from the results of Examples 11 to 18 that the formation of pinholes is suppressed in both of the positive electrode plate and the negative electrode plate and a sufficient charging time can be achieved. Specifically, it is found that, although the solder plating layer 26 does not have an excellent property of covering (property of burying) the aforementioned recess portion, laminating the solder plating layer 26 8 μm or more, preferably 10 μm or more can compensate for the covering property and burry the recess portion to such a level that the formation of pinholes above the recess portion in the first and second lead plating layers 27, 28 can be suppressed.

Moreover, in Examples 11 to 14, the discharging time increases with an increase in the laminated plating film thickness. Meanwhile, in Examples 15 to 18, although the discharging time increases with the increase in the laminated plating film thickness, the increase amount thereof is small. This is because, in the current technique of generating the active material, the discharging time saturates when the film thickness of the active material layer 24 reaches a certain value or more and there is a room for further research in film properties of active material and the like. Note that, in Examples 13 and 14, the energy density per mass of the lead-acid battery is equivalent to that of a nickel hydride battery.

It is found from the above facts that it is desirable to set the laminated plating film thickness within a range 30 μm or more and 200 μm or less and to set at least the film thickness of the solder plating layer 26 to 10 μm or more, in consideration of the weight reduction and thickness reduction of the electrode body 21 based on a relationship with the average mass of the electrode body 21. Moreover, the solder plating layer 26 also contains a lead component and can thus stop the corrosion by dilute sulfuric acid to some extent. Accordingly, it is desirable to increase the film thickness of the solder plating layer 26. Meanwhile, increasing the film thickness of the first and second lead plating layers 27, 28 and making the active material layer 24 thick leads to an increase in the discharging time. Thus, any design changes can be made to the relationships between the film thickness of the solder plating layer 26 and the film thickness of the first and second lead plating layers 27, 28 depending on the specifications of the lead-acid battery and the like.

Next, steps of manufacturing the electrode body 21 in the second embodiment of the present invention is described with reference to FIG. 13B. Note that the method of plating is not limited to the steps in the present invention as long as the method does not depart from the spirit of the present invention.

(Step 1)

A thin-plate-shaped base member 22 having a shape illustrated in FIG. 4 and made of aluminum or aluminum alloy is prepared. Generally, a surface of aluminum forming the base member 22 is covered with a strong oxide layer and cannot be plated with good adhesion. Thus, surface preparation is performed on the base member 22. Specifically, a method such as anodization, electroless nickel plating, or tin substitution plating can be selected as the surface preparation. In this step, an aluminum oxide film on the surface of the base member 22 is removed by publicly-known syndicate processing and then electroless nickel plating is employed to form the nickel plating layer 25 covering the surface of the base member 22. Note that the film thickness of the nickel plating layer 25 is about 1 µm or more and 5 µm or less and the nickel plating layer 25 has excellent uniform electrodeposition properties and is firmly formed also on the aforementioned recess portion of the base member 22.

(Step 2)

Next, the solder plating layer 26 covering the nickel plating layer 25 on the surface of the base member 22 is formed. The solder plating layer 26 can be formed by using one of plating baths of a fluorosilicate bath, a fluoborate bath, and an organic acid bath or a combination of two or more of these plating baths.

In this step, for example, the fluoborate bath is used and a solder plating liquid to which an organic additive such as gelatin or peptone is added by 1 g/L to 20 g/L to improve uniform electrodeposition properties and which is composed mainly of 2 g/L to 10 g/L metal tin, 90 g/L to 98 g/L metal lead, and 100 g/L to 250 g/L fluoroboric acid in terms of concentration is used. Then, the plate is rocked in an up-down direction while the bath is uniformly agitated with a current applied for 10 minutes to 60 minutes at a current density of 1 A/dm$^2$ to 20 A/dm$^2$ by using an anode electrode in which the ratio (mass ratio) between lead and tin is 9:1. The pinhole-free solder plating layer 26 is thereby laminated on the surface of the nickel plating layer 25. Note that, as described above, the plating processing is performed such that the film thickness of the solder plating layer 26 reaches at least 10 µm or more, in consideration of the covering property (burying property) of the solder plating. Moreover, when the aforementioned solder plating liquid is used, the solder plating layer 26 having such a metal composition that the ratio (mass ratio) between lead and tin is 9:1 is formed.

(Step 3)

Next, the first lead plating layer 27 and the second lead plating layer 28 made of lead or lead alloy and covering the solder plating layer 26 on the surface of the base member 22 are formed. The first lead plating layer 27 and the second lead plating layer 28 can be formed by using one of plating baths of a fluorosilicate bath, a fluoborate bath, and an organic acid bath or a combination of two or more of these plating baths.

In this step, first, for the first lead plating layer 27, the fluoborate bath is used and a lead plating liquid to which an organic additive such as gelatin or peptone is added by 1 g/L to 20 g/L to improve uniform electrodeposition properties and which is composed mainly of 100 g/L to 150 g/L metal lead and 100 g/L to 200 g/L fluoroboric acid in terms of concentration is used. Then, the plate is rocked in an up-down direction while the bath is uniformly agitated with a current applied for 10 minutes to 100 minutes at a current density of 1 A/dm$^2$ to 20 A/dm$^2$ by using lead and lead alloy with a purity of 99.99% as an anode. The pinhole-free first lead plating layer 27 is thereby laminated on the surface of the solder plating layer 26. In the plating condition using the aforementioned lead plating liquid, the first lead plating layer 27 having a metal composition containing lead at a purity of 99.99% or more is formed. Note that, as described above, a plating layer made of lead-tin alloy having a metal composition containing lead at a purity of 95% or more, preferably 97% or more may be formed as the first lead plating layer 27.

Next, for the second lead plating layer 28, the fluoborate bath is used and a lead plating liquid to which an organic additive such as gelatin or peptone is added by 1 g/L to 20 g/L to improve uniform electrodeposition properties and which is composed mainly of 80 g/L to 120 g/L metal lead and 150 g/L to 300 g/L fluoroboric acid in terms of concentration is used. Then, the plate is rocked in an up-down direction while the bath is uniformly agitated with a current applied for 10 minutes to 100 minutes at a current density of 1 A/dm$^2$ to 20 A/dm$^2$ by using lead and lead alloy with a purity of 99.99% as an anode. The pinhole-free second lead plating layer 28 is thereby laminated on the surface of the first lead plating layer 27. In the plating condition using the aforementioned lead plating liquid, the second lead plating layer 28 having a metal composition containing lead at a purity of 99.99% or more is formed. Note that, as described above, a plating layer made of lead-tin alloy having a metal composition containing lead at a purity of 95% or more, preferably 97% or more may be formed as the second lead plating layer 28.

Note that, in this step, the surface roughness Ra of the first lead plating layer 27 is, for example, 0.05 µm or more and less than 5.000 µm, the surface roughness Ra of the second lead plating layer 28 is, for example, 5.000 µm or more and 50.000 µm or less, and the surface roughness of the second lead plating layer 28 is greater than the surface roughness of the first lead plating layer 27. This is achieved by, for example, setting the temperature of the plating liquid for forming the second lead plating layer 28 lower than the temperature of the plating liquid for forming the first lead plating layer 27 and performing plating at a high current density of 10 A/dm$^2$ or more.

Although the film thickness of the solder plating layer 26 and the first and second lead plating layers 27, 28 can be made equal to or greater than 200 µm by changing the concentration, the current application time, the temperature, the current density, and the current waveform, the film thickness is set to 30 µm or more and 200 µm or less in both of the positive electrode plate and the negative electrode plate in consideration of the uniformness of the surface and an increase in mass. Note that the weight reduction of the lead-acid battery is achieved by forming the nickel plating layer 25, the solder plating layer 26, and the first and second lead plating layers 27, 28 on the surface of the base member made of aluminum or aluminum alloy similarly in the positive electrode terminal, the negative electrode terminal, and the electrode plate group stripe of the lead-acid battery.

(Step 4)

Next, the active material layer 24 is formed on the surface of the first and second lead plating layers 27, 28 by electrolytic formation treatment. In this step, the current is continuously applied at a current density of 0.1 A/dm$^2$ to 10 A/dm$^2$ by using a lead plate or an insoluble electrode in dilute sulfuric acid with specific gravity of 1.01 to 1.30. Then, the current is reversed every 6 hours to 12 hours. In the base member 22 to be used as the positive electrode plate, the final current application is performed with the base member 22 being the anode and a dark brown positive electrode active material is thereby made to deposit on the surface of the lead plating layer. Meanwhile, in the base member 22 to be used as the negative electrode plate, the final current application is performed in a similar method with the base member 22 being the cathode and a gray negative electrode active material is thereby made to deposit on the surface of the lead plating layer. The base member 22 on which the active material is formed is sufficiently washed under running water and dried by hot air. Then, the base member 22 is left as it is for 24 hours or more to be matured and the positive electrode plate or the negative electrode plate is thus obtained.

Finally, in the aforementioned plating steps of (Step 2) and (Step 3), the plating is performed while reversing the current during the plating steps by using a pulse power source or a PR power source to prevent a projecting object from causing short-circuit in a plating outer peripheral surface and to achieve an uniform plating film thickness. The ratio of reversing is anode:cathode=1:10 to 50.

In the embodiment, description is given of the case where the aforementioned recess portion formed on the surface of the base member 22 is burred by the solder plating layer 26 with a film thickness or 10 μm or more and made flat. However, the present invention is not limited to this case and may be as follows: for example, the oxide film on the surface of the base member 22 is treated as in the first embodiment; and as a pre-process of forming the nickel plating layer 25, for example, the recess portion made by a dent or the like on the surface of the base member 22 is removed by using a very fine 3000 grit sandpaper and a flat surface is thereby formed on the surface of the base member 22. Alternatively, as a method of removing the aforementioned recess portion on the surface of the base member 22, a chemical polishing process may be used.

Moreover, also in the second embodiment, as in the first embodiment, effects such as the weight reduction and size reduction of the entire lead-acid battery and an improvement in energy density can be obtained by similarly manufacturing the positive electrode terminal, the negative electrode terminal, and the electrode plate group stripe which are components of the lead-acid battery other than the positive electrode plate and the negative electrode plate by using an aluminum material and forming the solder plating layer 26 and the first and second lead plating layers 27, 28 on the surface of the aluminum material. Moreover, subjecting the positive electrode terminal, the negative electrode terminal, and the electrode plate group stripe to the aforementioned plating processing can prevent corrosion caused by dilute sulfuric acid mist generated in the charging and discharging processes of the lead-acid battery during use of the lead-acid battery. Furthermore, effects such as reduction of fall-off of the active material layer 24 achieved by the improvement in adherence and saving of resources achieved by collecting and reusing metals and chemicals through collection and recycling of the plating liquid can be obtained as in the first embodiment.

Next, an electrode body 41 of a lead-acid battery according to a third embodiment of the present invention is described in detail based on the drawings. The electrode body 41 of the third embodiment is different from the electrode body 21 of the second embodiment mainly in that the electrode body 41 has a structure in which a tin plating layer 43 is formed between the nickel plating layer 25 and the solder plating layer 26. Accordingly, in the following description, when the electrode body 41 is described, the same members as those in the second embodiment are denoted by the same reference numerals in principal and overlapping description is omitted. Moreover, as in the description of the second embodiment, the first embodiment described by using FIGS. 1 to 12 is referred to as appropriate.

Figure 15A:
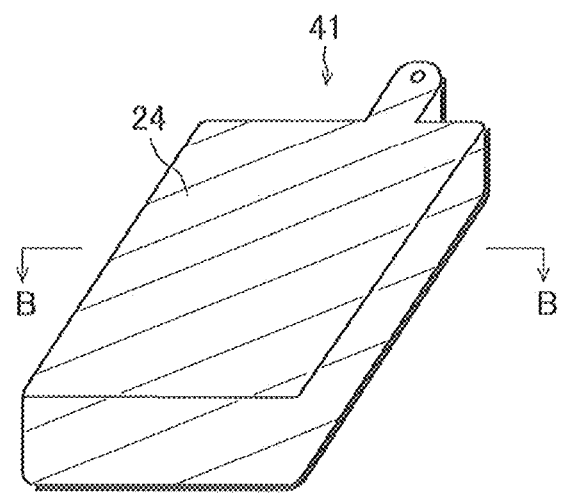
FIGS. 15A and 15B are a perspective view and a cross-sectional view, respectively, explaining an electrode body for a lead-acid battery in a third embodiment of the present invention.
Figure 15B:
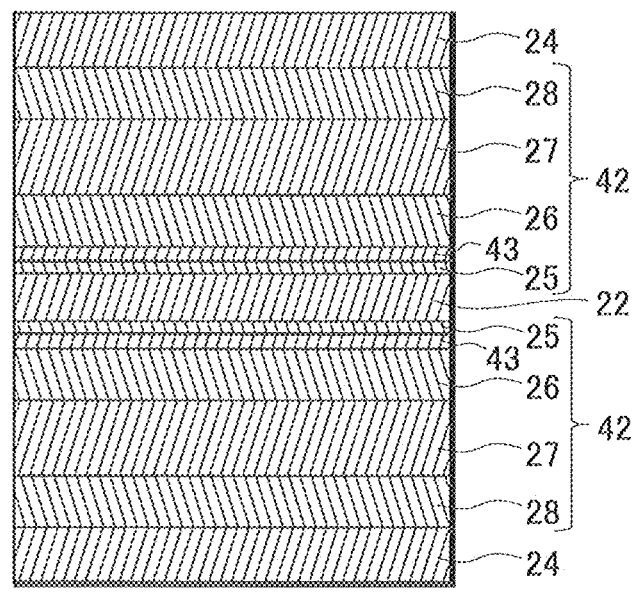

FIG. 15A is a perspective view explaining the electrode body 41 of the lead-acid battery in the embodiment. FIG. 15B is a cross-sectional view of the electrode body 41 in the line B-B direction illustrated in FIG. 15A.

As illustrated in FIG. 15A, the thin plate-shaped base member 22 having a shape illustrated in FIG. 4 and made of aluminum or aluminum alloy is used for the electrode body 41. Then, multiple plating layers 42 are formed on the surface of the base member 22. The first and second lead plating layers 27, 28 (see FIG. 15B) located in the outer surface portion of the multiple plating layers 42 are at least partially subjected to electrolytic formation treatment to form the active material layer 24.

As illustrated in FIG. 15B, the electrode body 41 includes the base member 22, the nickel plating layer 25 covering the surface of the base member 22, the tin plating layer 43 covering the surface of the nickel plating layer 25 and made of tin or tin-lead alloy, the solder plating layer 26 covering a surface of the tin plating layer 43, the first lead plating layer 27 covering the surface of the solder plating layer 26 and having a fine metal composition, the second lead plating layer 28 covering the surface of the first lead plating layer 27 and having the rougher metal composition than the first lead plating layer 27, and the active material layer 24 formed by at least partially subjecting the first and second lead plating layers 27, 28 to the electrolytic formation treatment. In the multiple plating layers 42 of the embodiment, many layers of group 4 metals with similar chemical properties are laminated to prevent the formation of pinholes and achieve improvements in adhesion and corrosion resistance.

As described in detail later, the tin plating layer 43 is a plating film formed as a measure against the pinholes as described also in the second embodiment and is formed on the surface of the nickel plating layer 26. Moreover, the tin plating layer 43 is a film with excellent covering property (burying property). The film thickness of the tin plating layer 43 is set to 1 μm or more and the upper limit value thereof is preferably set to 10 μm from the viewpoint of weight reduction. This allows the tin plating layer 43 to burry a step formed by the recess portion made by a dent or a scratch formed on the surface of the base member 22 and prevent the formation of pinholes in the multiple plating layers 42 located above the tin plating layer 43.

In this case, the tin plating layer made of tin is a plating layer having a metal composition containing tin at a purity of 99.99% or more. The plating layer made of tin-lead alloy is an alloy plating layer of lead and tin containing tin at a purity of 95% or more, preferably an alloy plating layer of lead and tin containing tin at a purity of 97% or more, more preferably an alloy plating layer of lead and tin containing tin at a purity of 99% at maximum. The same applies to the following description.

FIG. 16 illustrates a result of a test in which single cells with the same structure as one used in the discharging test described by using FIG. 8 were formed and a discharging test was performed. Specifically, five positive electrode plates using the active material layer 24 of the electrode body 41 as the positive electrode active material layer were prepared and were each covered with a separator. Meanwhile, six negative electrode plates using the active material layer 24 of the electrode body 41 as the negative electrode active material layer were prepared. Then, the aforementioned positive electrode plates and the negative electrode plates were alternately stacked and the positive electrode terminal and the negative electrode terminal were attached to the stacked body to form the single cell. Dilute sulfuric acid with specific gravity of 1.01 to 1.30 was injected into the single cell and the single cell was left as it is until heat generation stopped. Then the cell was charged for 24 hour or more at a constant voltage of 2.2 V to 2.7 V and a single cell battery with a nominal voltage of 2 V was thus manufactured. After the completion of charging, a discharging test was performed by connecting a light bulb of 2.5V, 0.5 A to the aforementioned single cell and lighting the light bulb.

The laminated plating film thickness illustrated in FIG. 15 is a film thickness of the laminated tin plating layer 43, solder plating layer 26, first lead plating layer 27, and second lead plating layer 28. In the embodiment, these layers are manufactured such that the film thickness ratio of tin plating layer 43:solder plating layer 26:first lead plating layer 27:second lead plating layer 28=1:1:1.5:1.5. Note that the film thickness ratio in the electrode body 41 is not limited to this film thickness ratio and any design change can be made depending on the specifications of the lead-acid battery and the like.

As illustrated in FIG. 16, in all of Examples 19 to 29, the formation of pinholes is suppressed in both of the positive electrode plate and the negative electrode plate. Moreover, in Example 19, the film thickness of the tin plating layer 43 is 0.8 μm at minimum and 1.2 μm at maximum and is about 1 μm and it is found that at least the plating layer 43 having the film thickness of 1 μm can bury the aforementioned recess portion on the surface of the base member 22 and suppress the formation of pinholes. Note that, although the film thickness of the tin plating layer 43 is increased in Examples 19 to 29, any design changes can be made to the film thickness of the tin plating layer 43 in consideration of stability of quality in mass production of the electrode body 41.

Moreover, in Examples 19 to 27, the discharging time increases with an increase in the laminated plating film thickness. Meanwhile, in Examples 28 to 29, although the discharging time increases with the increase in the laminated plating film thickness, the increase amount thereof is small. Note that, in Example 24, the energy density per mass of the lead-acid battery is equivalent to that of a nickel hydride battery.

It is found from the above facts that Examples up to Example 26 are preferable for conditions taking in consideration of the weight reduction and thickness reduction of the electrode body 41 based on a relationship with the average mass of the electrode body 41. In Example 26, the laminated plating film thickness is about 150 μm and, for example, the film thickness of the tin plating layer 43 is about 30 μm. Thus, setting the film thickness of the tin plating layer 43 to 30 μm or less, more preferably 10 μm or less can achieve weight reduction while the solder plating layer 26 and the first and second lead plating layers 27, 28 are made to have large film thicknesses. It is found that, also in this case, as in the second embodiment, setting the film thickness of the solder plating layer 26, the first lead plating layer 27, and the second lead plating layer 28 to about 150 μm to 200 μm sufficiently improves the charging and discharging performances of the lead-acid battery.

Note that, as described above in the second embodiment, the solder plating layer 26 also contains a lead component and can thus stop the corrosion by dilute sulfuric acid to some extent. Accordingly, it is desirable to increase the film thickness of the solder plating layer 26. Meanwhile, increasing the film thickness of the first and second lead plating layers 27, 28 and making the active material layer 24 thick leads to an increase in the discharging time. Thus, any design changes can be made to the relationships between the film thickness of the solder plating layer 26 and the film thicknesses of the first and second lead plating layers 27, 28 depending on the specifications of the lead-acid battery and the like.

Next, steps of manufacturing the electrode body 41 in the third embodiment of the present invention is described with reference to FIG. 15B. Note that the method of plating is not limited to the steps in the present invention as long as the method does not depart from the spirit of the present invention. Moreover, the steps of manufacturing the electrode body 41 are the same as those described in the second embodiment except for the point that a step of forming the tin plating layer 43 is newly added as (Step X) between (Step 2) and (Step 3) described in the second embodiment. In this embodiment, only the step of forming the tin plating layer 43 is described while referring to the description of the second embodiment.

(Step X)

The tin plating layer 43 covering the nickel plating layer 25 is formed. The tin plating layer 43 can be formed by using one of plating baths of an alkanolsulfonate bath, a phenolsulfonate bath, a fluoborate bath, and a sulfate bath or a combination of two or more of these baths.

In this step, for example, the sulfate bath is used and a tin plating liquid to which an organic additive such as gelatin or peptone is added by 20 g/L to 50 g/L to improve uniform electrodeposition properties and which is composed mainly of 20 g/L to 80 g/L stanous sulfate and 50 g/L to 200 g/L sulfuric acid in terms of concentration is used. Then, the plate is rocked in an up-down direction while the bath is uniformly agitated with current applied for 10 minutes to 40 minutes at a current density of 1 A/dm$^2$ to 10 A/dm$^2$. The pinhole-free tin plating layer 43 is thereby laminated on the surface of the nickel plating layer 25. In the plating condition using the aforementioned tin plating liquid, the tin plating layer 43 having a metal composition with a purity of 99.99% or more is formed.

Also in this plating step, the plating is performed while reversing the current during the plating step by using a pulse power source or a PR power source to prevent a projecting object from causing short-circuit in a plating outer peripheral surface and to achieve an uniform plating film thickness. The ratio of reversing is anode:cathode=1:10 to 50.

In the embodiment, description is given of the case where the aforementioned recess portion formed on the surface of the base member 22 is burred by the tin plating layer 43 with a film thickness or 1 μm or more and made flat. However, the present invention is not limited to this case and may be as follows: for example, the oxide film on the surface of the base member 22 is treated as in the first embodiment; and as a pre-process of forming the nickel plating layer 25, for example, the recess portion made by a dent or the like on the surface of the base member 22 is removed by using a very fine 3000 grit sandpaper and a flat surface is thereby formed on the surface of the base member 22. Alternatively, as a method of removing the aforementioned recess portion on the surface of the base member 22, a chemical polishing process may be used.

Moreover, also in the third embodiment, as in the first embodiment, effects such as the weight reduction and size reduction of the entire lead-acid battery and an improvement in energy density can be obtained by similarly manufacturing the positive electrode terminal, the negative electrode terminal, and the electrode plate group stripe which are components of the lead-acid battery other than the positive electrode plate and the negative electrode plate by using an aluminum material and forming the tin plating layer, the solder plating layer, and the lead plating layer on the surface of the aluminum material. Moreover, subjecting the positive electrode terminal, the negative electrode terminal, and the electrode plate group stripe to the aforementioned plating processing can prevent corrosion caused by dilute sulfuric acid mist generated in the charging and discharging processes of the lead-acid battery during use of the lead-acid battery. Furthermore, effects such as reduction of fall-off of the active material layer 24 achieved by the improvement in adherence and saving of resources achieved by collecting and reusing metals and chemicals through collection and recycling of the plating liquid can be obtained as in the first embodiment.

In the aforementioned second and third embodiments, description is given of the case where the lead plating layers are formed as two plating layers of the first lead plating layer 27 with the fine composition and the second lead plating layer 28 with the rougher composition than the first lead plating layer 27. However, the present invention is not limited to this case. For example, the lead plating layer may be formed of a single layer of the first lead plating layer 27 or the second lead plating layer 28. Moreover, the lead plating layers may be formed as three or more films laminated one on top of another. In this case, the charging and discharging performances of the lead-acid battery can be improved by making the film quality of the outermost plating film roughest and thereby increasing the surface area of the active material layer 24.

Moreover, in the first to third embodiments, description is given of the case where the active material layer is formed by generating the positive electrode active material or the negative electrode active material by electrolytic formation treatment on the lead plating layer formed on the aluminum or aluminum alloy base member. However, the present invention is not limited to this. For example, as in the conventional technique, an electrode plate of a type using an unconverted paste-form active material may be manufactured by applying the aforementioned active material paste and performing preheating drying, maturing, and drying. Moreover, various changes can be made within a scope not departing from the spirit of the present invention.

INDUSTRIAL APPLICABILITY

The present invention is used in the industry manufacturing lead-acid batteries. Unlike the conventional storage battery using lead or lead compound with large specific gravity for the electrode current collector lattice, the components of the lead-acid battery such as the positive electrode plate, the negative electrode plate, the electrode terminals, and the electrode plate group stripe are manufactured by using aluminum or aluminum alloy which has low specific gravity and high electrical conductivity. Accordingly, it is possible to greatly reduce the weight and the usage amount of lead and greatly improve the energy density which is about 35 KH/kg in a current lead-acid battery.

Moreover, the volume resistance of lead is $20.8 \times 10^{-8}$ $\Omega \cdot m$ while the volume resistance of aluminum is about $2.8 \times 10^{-8}$ $\Omega \cdot m$ and aluminum has lower resistance than lead. In the positive electrode plate and the negative electrode plate, the multiple plating layers 23, 42 are entirely formed on the base member 22 made of aluminum. Accordingly, the positive electrode plate and the negative electrode plate each have a large contact area as the current collector lattice and the charging efficiency of the lead-acid battery is thus improved.

The pinholes formed in the process of manufacturing the components of the lead-acid battery such as the positive electrode plate and the negative electrode plate and in the use of the lead-acid battery are prevented by the method of laminating many layers of group 4 metals by using the electrolyte plating method. Moreover, the electrolyte lead plating in which the final lead plating layer is formed to have a surface roughness Ra of 0.500 μm to 40.000 μm is performed to increase the surface area and then the positive electrode active material or the negative electrode active material is generated on the lead plating layer by using the electrolytic formation treatment using dilute sulfuric acid.

As a result, the weight and thickness can be reduced compared to the conventional dry manufacturing method in which the lattice made of lead alloy is filled with the lead powder paste obtained by kneading fine lead powder and sulfuric acid. Moreover, there is no dispersal of fine lead powder and this contributes to improvements in a working environment in a manufacturing site. Moreover, in the plating step, the collection rate and the reuse rate of tin and lead are high and this contributes to reduction of manufacturing cost. Regarding the performance of the lead-acid battery, since the aluminum base member with excellent conductivity is used inside the electrode plates and the like and the surface areas of the electrode plates and the like are large, the charging efficiency is improved and the charging speed can be improved from that in the current lead-acid battery in which the lead alloy lattice is filled with the lead paste.

Furthermore, the energy density is improved by the weight reduction and the thickness reduction and the present invention can be expected to sufficiently contribute not only to cars and transport vehicles but also to a large-scale storage battery in a large uninterruptable power supply, a reusable energy power storage system, and the like as a high performance lead-acid battery. Particularly, for the automotive industry, in a global trend of electrification, the present invention improves the energy density of the lead-acid battery which is safe and has a long history and thereby contributes greatly to an improvement in fuel efficiency achieved by weight reduction of a vehicle body. In a global perspective, the present invention contributes to comprehensive technical development as a basic component part for the electrification of the vehicle in the future and thus has an industrial utility value including environmental measures.

REFERENCE SIGNS LIST 1 pinhole-free rough lead plating film
2 pinhole-free fine lead plating film
3 pinhole-free fine lead alloy plating film
4 thin plate made of aluminum material with thickness of 0.2 mm
5 pinhole-free fine lead alloy plating film
6 pinhole-free fine lead plating film
7 pinhole-free rough lead plating layer
8 lead plating film subjected to anodic electrolysis in dilute sulfuric acid
9 lead plating film subjected to cathodic electrolysis in dilute sulfuric acid
10 electrode plate obtained by plating aluminum thin plate with thickness of 0.2 mm with lead and lead alloy
11 hanging hole for lead and lead alloy plating 21, 41 electrode body
22 base member
23, 42 multiple plating layers
24 active material layer
25 nickel plating layer
26 solder plating layer
27 first lead plating layer
28 second lead plating layer
43 tin plating layer

The invention claimed is:

1. An electrode body for a lead-acid battery which forms a positive electrode plate or a negative electrode plate of the lead-acid battery, comprising:
    a base member made of aluminum or aluminum alloy;
    a nickel plating layer covering the base member;
    a solder plating layer covering the nickel plating layer; and
    a lead plating layer covering the solder plating layer, wherein
    a pinhole preventing tin plating layer is formed between the nickel plating layer and the solder plating layer.

2. The electrode body for a lead-acid battery according to claim 1, wherein a film thickness of the tin plating layer is 1 μm or more.

3. The electrode body for a lead-acid battery according to claim 1, wherein
    the lead plating layer includes at least a first lead plating layer covering the solder plating layer and a second lead plating layer covering the first lead plating layer, and
    the first lead plating layer is formed of a plating film that is less rough than the second lead plating layer.

4. The electrode body for a lead-acid battery according to claim 1, wherein an active material layer is formed on a surface of the lead plating layer.

5. A lead battery, wherein the electrode body according to claim 1 is used as a positive electrode plate and a negative electrode plate.

6. A method of manufacturing an electrode body for a lead-acid battery which forms a positive electrode plate or a negative electrode plate of the lead-acid battery, the method comprising:
    preparing a base member made of aluminum or aluminum alloy;
    forming a tin plating layer covering the base member by electroplating;
    forming a solder plating layer covering the tin plating layer by electroplating; and
    forming a lead plating layer covering the solder plating layer by electroplating.

7. The method of manufacturing an electrode body for a lead-acid battery, according to claim 6, wherein a film thickness of the tin plating layer is 1 μm or more.

8. The method of manufacturing an electrode body for a lead-acid battery, according to claim 6, wherein
    at least a first lead plating layer covering the solder plating layer and a second lead plating layer covering the first lead plating layer are formed as the lead plating layer by electroplating, and
    the first lead plating layer is formed of a plating film that is less rough than the second lead plating layer.

9. The method of manufacturing an electrode body for a lead-acid battery, according to claim 6, wherein an active material layer is formed on a surface of the lead plating layer.

10. The method of manufacturing an electrode body for a lead-acid battery, according to claim 9, wherein the tin plating layer, the solder plating layer, and the lead plating layer are formed by using a fluoborate bath.

11. The electrode body for a lead-acid battery according to claim 3, wherein an active material layer is formed on a surface of the lead plating layer.

12. A lead battery, wherein the electrode body according to claim 3 is used as a positive electrode plate and a negative electrode plate.

13. A lead battery, wherein the electrode body according to claim 4 is used as a positive electrode plate and a negative electrode plate.

14. A lead battery, wherein the electrode body according to claim 11 is used as a positive electrode plate and a negative electrode plate.

15. The method of manufacturing an electrode body for a lead-acid battery, according to claim 8, wherein an active material layer is formed on a surface of the lead plating layer.

16. The method of manufacturing an electrode body for a lead-acid battery according to claim 6, further including forming a nickel plating layer covering the base member by electroplating, and wherein said forming a tin plating layer covering the base member includes forming the tin plating layer covering the nickel plating layer by electroplating.

17. The electrode body for a lead-acid battery according to claim 1, wherein
    the lead plating layer includes at least a first lead plating layer covering the solder plating layer and a second lead plating layer covering the first lead plating layer, and
    the first lead plating layer is a fine plating layer and the second lead plating layer is a coarse plating layer.

18. The method of manufacturing an electrode body for a lead-acid battery, according to claim 6, wherein
    at least a first lead plating layer covering the solder plating layer and a second lead plating layer covering the first lead plating layer are formed as the lead plating layer by electroplating, and
    the first lead plating layer is a fine plating layer and the second lead plating layer is a coarse plating layer.

19. The electrode body for a lead-acid battery according to claim 1, wherein
    the tin plating layer buries a step formed by a recess on a surface of the base member and prevents the formation of pinholes in the plating layers above the tin plating layer.

* * * * *